July 11, 1961  G. L. WHITE ET AL  2,991,970
SUSPENDED VEHICLE SEAT
Filed Nov. 3, 1958  5 Sheets-Sheet 3
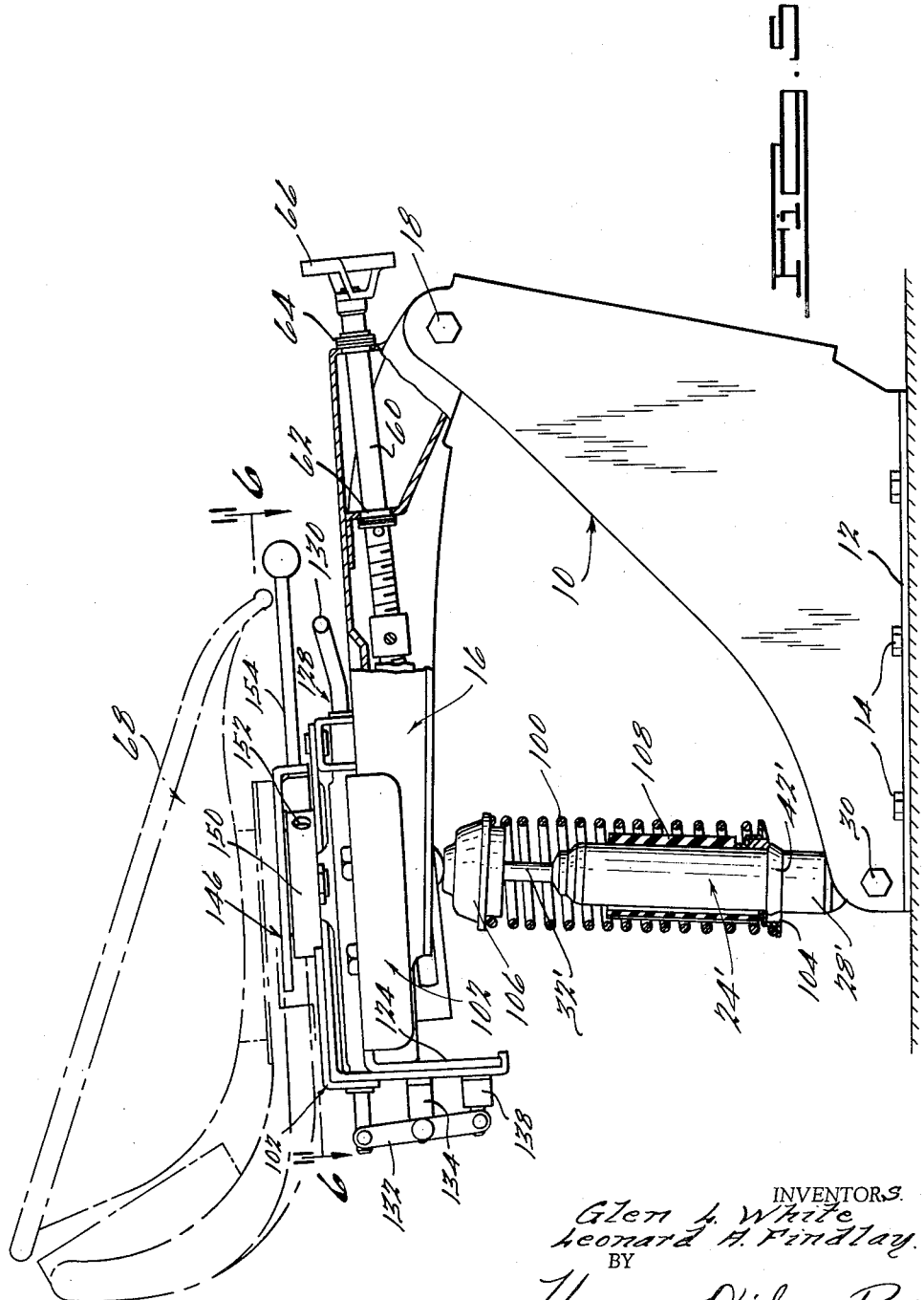
INVENTORS.
Glen L. White
Leonard H. Findlay
BY
Harness, Dickey & Pierce
ATTORNEYS.

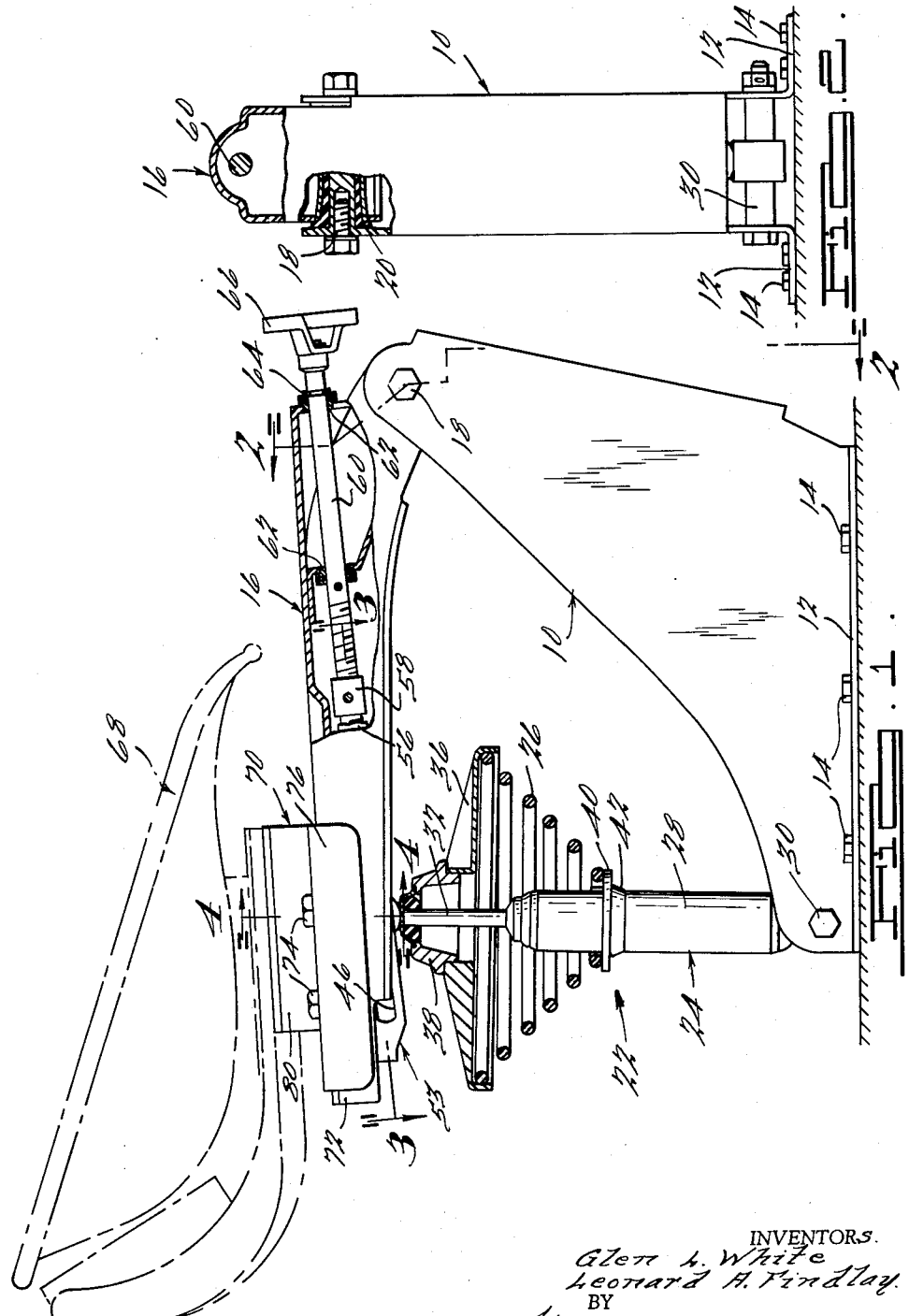

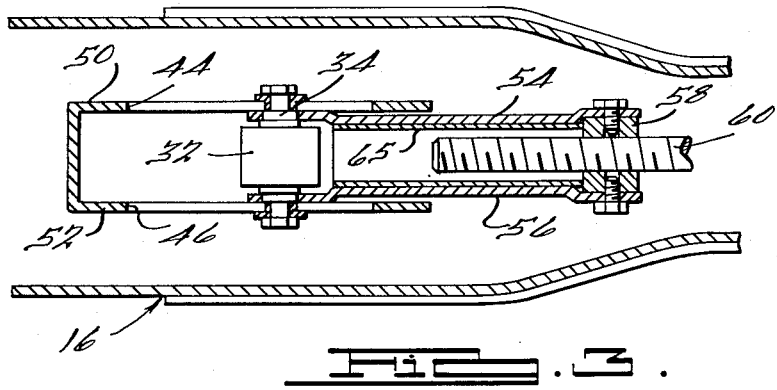
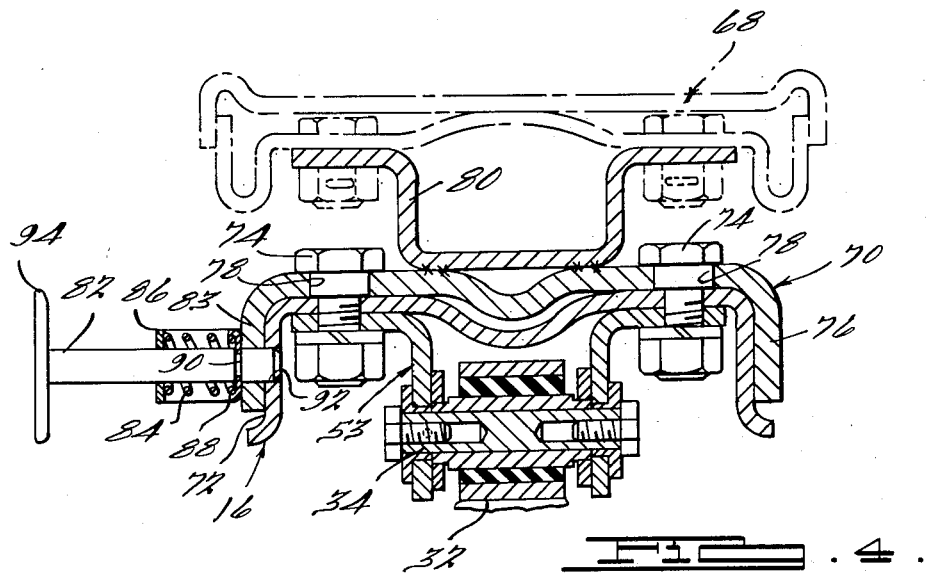

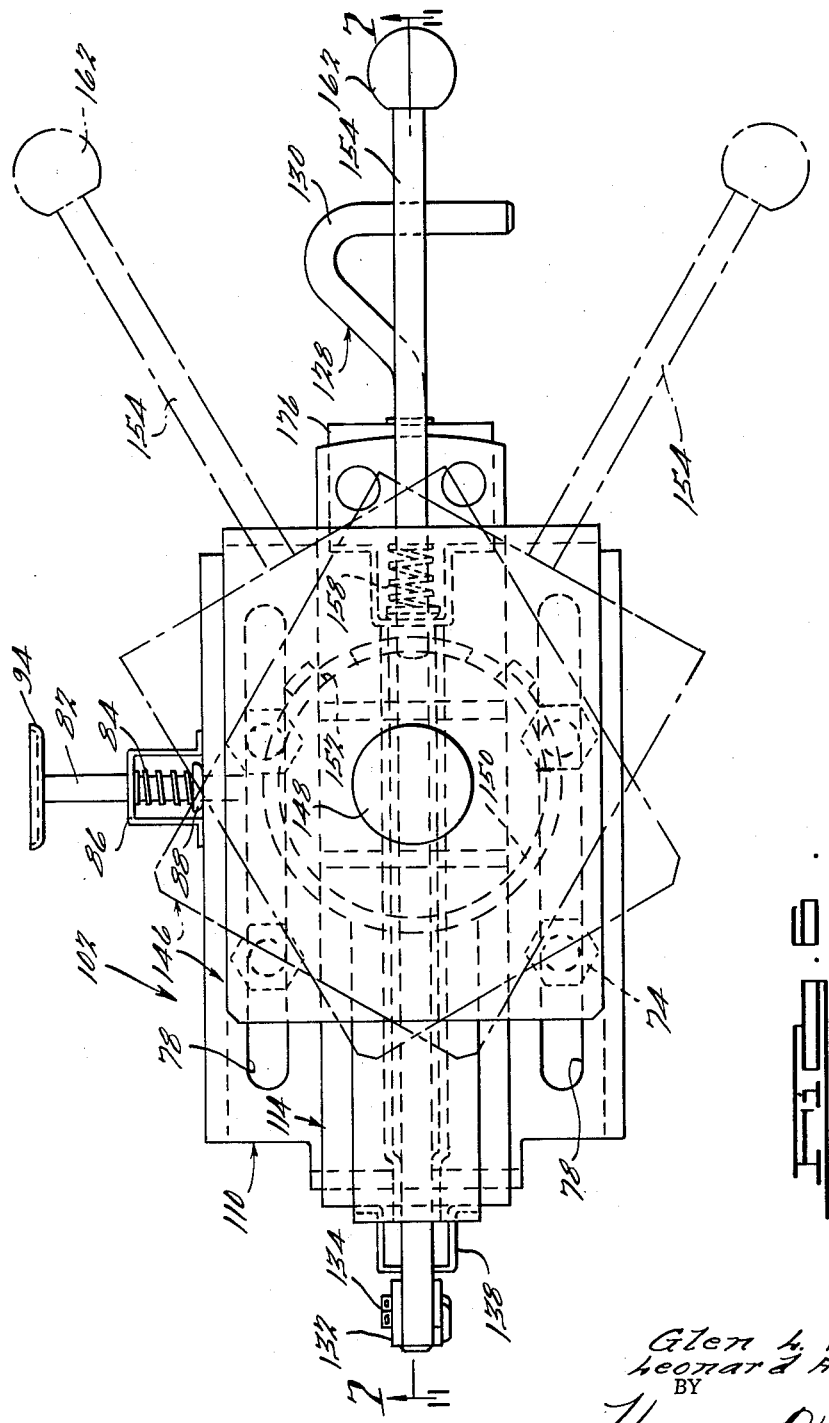

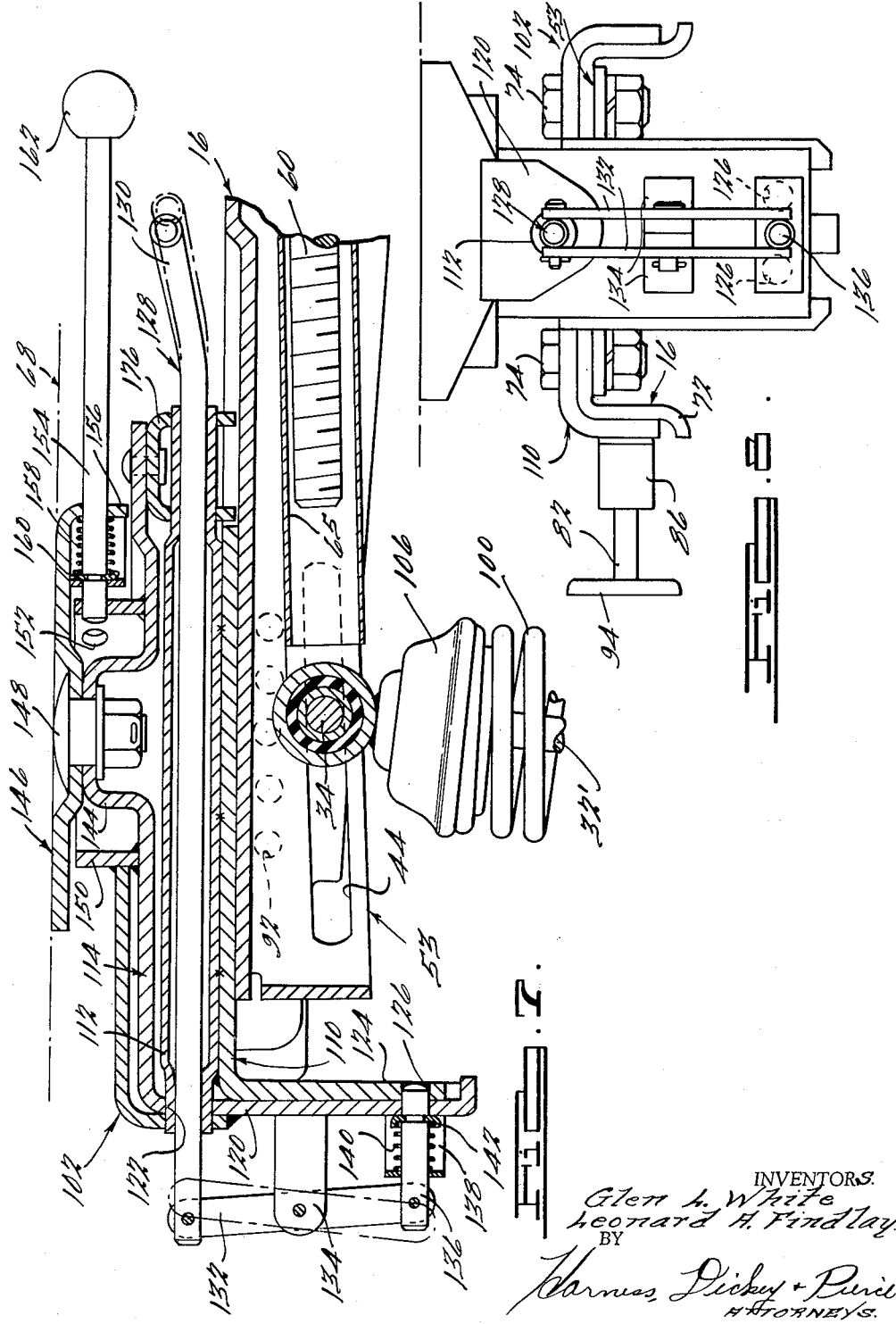

2,991,970
SUSPENDED VEHICLE SEAT
Glen L. White and Leonard A. Findlay, Monroe, Mich., assignors to Monroe Auto Equipment Company, Monroe, Mich., a corporation of Michigan
Filed Nov. 3, 1958, Ser. No. 771,311
2 Claims. (Cl. 248—377)

This invention relates to an improved seat support and suspension arrangement, and more particularly to an adjustable vehicle seat support especially suited for use in work vehicles such as tractors and the like.

One important object of the present invention is to provide an improved seat support and suspension arrangement of rugged and durable, yet compact and inexpensive construction.

Other objects and advantages of the invention are: to provide an improved seat suspension construction including improved means for adjusting the effective spring rate thereof; to provide an improved seat suspension construction including a direct-acting shock absorber, and a spring mounted between the two relatively movable parts of the shock absorber, the spring and the shock absorber cooperating to provide a damped resilient support; to provide an improved seat suspension including a horizontal arm pivoted upon a fixed support member at one end and resiliently supported near its other end, and means for adjusting the spacing between the fixed pivot and the resilient support thereby to vary the effective spring rate of the resilient support; to provide an improved seat support for a work vehicle such as a tractor or the like including adjustment means for selectively varying the angular position of the seat about both horizontal and vertical axes relative to the vehicle in which it is mounted, and means for latching the seat in any one of a plurality of predetermined positions; and in general to provide an improved seat support and suspension system of improved convenience and flexibility of operation, and of rugged and durable, yet inexpensive construction.

The foregoing and other objects and advantages of the present invention will become apparent in the following detailed description of representative embodiments thereof, taken in conjunction with the drawings, wherein:

FIGURE 1 is a side elevational view, partly in section of a seat support construction according to a first embodiment of the invention;

FIG. 2 is a cross-sectional view taken along the line 2—2 of FIG. 1;

FIG. 3 is a longitudinal sectional view taken along the line 3—3 of FIG. 1;

FIG. 4 is a cross-sectional view taken along the line 4—4 of FIG. 1;

FIG. 5 is a side elevational view, partly in section of a seat support assembly according to a second embodiment of the invention;

FIG. 6 is a plan view of the seat support illustrated in FIG. 5, the view being taken generally along the line 6—6 thereof;

FIG. 7 is a longitudinal sectional view taken generally along the line 7—7 of FIG. 6; and FIG. 8 is a rear elevational view of the seat support and suspension assembly shown in FIG. 5.

A vehicle seat support construction according to a first embodiment of the invention is illustrated in FIGS. 1-4 and comprises an upright base 10 of U-shaped horizontal section having outturned flanges 12 along its lower edges through which screws, or bolts 14 are passed to secure the assembly to the vehicle in which it is to be mounted. A pivot arm 16 is supported at its front end upon a pivot 18 near the top of the base 10, and extends rearwardly in a generally horizontal direction. The pivot 18 may include a rubber bushing 20, if desired, to minimize noise in operation. The pivot arm 16 is supported adjacent to its rear end upon a suspension unit 22, which includes a direct-acting type hydraulic shock absorber 24 and a variable rate coil spring 26. The shell 28 of the shock absorber is attached to a pivot 30, which is mounted in the base 10 at the rear and near the bottom thereof. The movable piston rod 32 of the shock absorber is secured to an adjustable pivot 34 carried by the pivot arm 16. The spring 26 is mounted between a cup-like retainer 36, which is secured by means of a washer assembly 38 to the upper end of the piston rod 32, and a washer 40, which rests against a radially projecting annular bump, or bulge 42 formed in the shell 28 of the shock absorber. The spring 26 is thus held in compression between the two movable parts of the shock absorber, that is, between the piston rod 32 and the shell 28.

The adjustable pivot 34 to which the piston rod 32 is attached is longitudinally slidable in a pair of slots 44 and 46 in the downturned flanges 50 and 52 of an angle iron bracket 53, which is fixed to and depends from the pivot arm 16. A pair of metal plates 54 and 56 which, taken together, constitute a yoke, are connected to the pivot 34 for driving it back and forth in the slots 44 and 46. The forward ends of the plates 54 and 56 are attached to a follower nut 58, which is threaded upon a screw drive shaft 60. The shaft 60 extends forwardly through the pivot arm 16, and is journaled in bearings 62 which are mounted on the pivot arm. The shaft 60 is held against longitudinal displacement relative to the pivot arm 16 by a washer 64, which is fixed to the pivot arm and engages an annular groove (not separately designated) in the shaft. The shaft 60 projects forwardly of the pivot arm 16 and carries a handwheel 66 by means of which it may be rotated to drive the nut 58 forward or rearwardly, thus driving the adjustable pivot 34 fore and aft with respect to the pivot arm 16 and thereby varying the effective mechanical advantage of the suspension unit 22 with respect to the pivot arm. The rear portion of the shaft 60 is protected by a tube 65 which extends rearwardly from the nut 58 and fits between the plates 54 and 56.

A seat pan 68, either in the form of a seat pan alone or in the form of an assembly wherein the seat pan is hinged to a support member, is secured to the pivot arm 16 near the rear thereof by a bracket 70. The construction of the seat 68 per se forms no part of this invention and is therefore shown by dashed lines in the drawings. The bracket 70 includes a longitudinally slidable plate 76, which is slidably secured to the pivot arm 16 by shoulder bolts 74, and which is provided with longitudinally extending slots 78 through which the shoulder portions of the bolts 74 extend. A seat bracket 80 is welded or otherwise rigidly secured to the slide plate 76 for supporting the seat 68 at a desired height above the pivot arm 16.

The slide plate 76, and thus the seat 68 may be latched in any one of a plurality of different longitudinal positions by a poppet pin 82, which is mounted upon the depending lateral flange 83 of the slide plate 76, and which is laterally movable with respect thereto into engagement with the adjacent flange 72 of the pivot arm. The pin 82 is biased inwardly toward the pivot arm flange 72 by a spring 84, which is held in compression between a bracket 86, which is welded to the flange 83, and a washer 88, which engages an annular groove 90 in the pin. The pin 82 is normally seated in any one of a plurality of apertures 92 in the pivot arm flange 72 to latch the seat in the desired longitudinal position. A handle 94 is fixed at the outer end of the pin 82 so that the pin may be withdrawn from the aperture 92 in which it is seated when it is desired to move the seat to a different position.

If desired, a constant rate coil spring may be used in place of the variable rate spring 26 illustrated in FIG. 1, but it has been found in practice that a variable rate spring usually provides superior ride characteristics, and the variable rate spring is therefore preferred. Also, with the use of a variable rate spring 26, the pivot adjustment mechanism, by means of which the upper pivot 34 is longitudinally traversable along the pivot arm 16, is of less importance, and if desired for reasons of economy, it may be dispensed with altogether. In this event, the upper pivot 34 would be fixed with respect to the pivot arm 16, and the variable rate spring 26 would be relied upon to automatically provide the necessary compensation for changes in load on the seat 68.

The modified arrangement shown in FIGS. 5–8 includes a fully adjustable seat bracket 102, which not only may be moved longitudinally along the pivot arm 16, but also may be tilted about both vertical and horizontal axes to provide for any desired seating attitude according to the convenience of the operator of the vehicle upon which the seat is installed. The modified arrangement is shown, for illustrative purposes only, as including a constant rate coil spring 100, although, for the reasons hereinabove given, it is generally preferred to use a variable rate spring.

The seat shown in FIGS. 5–8 includes the constant rate spring 100, which is fitted upon a direct-acting type hydraulic shock absorber 24′ between a lower seat 104 and an upper seat 106. The lower seat 104 is supported near the lower end of the shock absorber casing 28′ upon a bead 42′ which conveniently may be formed integrally with the casing 28′, and the upper seat 106 is secured to the piston rod 32′ at the upper end thereof. As shown, a spring follower 108 is fitted around the shock absorber casing 28′ to insure proper spacing of the spring 100 from the casing 28′ and to guide the spring 100, thus ensuring quiet operation.

The seat bracket 102 includes a slide plate 110 slidably mounted on top of the pivot arm 16 and latchable thereon in any one of a plurality of different longitudinal positions by the fore and aft poppet pin 82, which is arranged as hereinabove described in connection with the construction shown in FIGS. 1–4.

A horizontal pivot tube 112 is welded or otherwise rigidly secured to the slide plate 110 and extends longitudinally therealong parallel to the center line of the pivot arm 16, and a tilt plate 114 is pivoted upon the tube 112 for limited rotational movement thereon. A clevis-like bracket is fixed to the forward end of the tilt plate 114, and extends downwardly over the pivot tube 112 for rotatably supporting the forward end of the tilt plate. The rear portion of the tilt plate 114 is bent downwardly to form a depending flange 120 which is apertured at 122 and fits over the pivot tube 112 for supporting the rear of the tilt plate.

A latch drawbar 128 is fitted through the pivot tube 112, and is bent at its forward end to form a handle 130. The drawbar 128 extends rearwardly out of the pivot tube and is connected to the upper end of a lever 132, which is pivoted upon a bracket 134 fixed to the depending flange 120 of the tilt plate. The lower end of the lever 132 is connected to a poppet pin 136. The poppet pin 136 is slidably mounted in a bracket 138, which is secured as by welding to the depending flange 120 of the tilt plate, and is spring urged forwardly toward the flange 124 of the slide plate by a compression coil spring 140. The spring 140 is seated between the rear wall of the bracket 138 and a washer 142, which engages an annular groove 143 in the pin. The pin 136 normally extends into one of the apertures 126 in the slide plate flange to latch the tilt plate 114 in a selected angular position. In order to change the tilt of the seat 68 the operator merely grasps the handle 130 and pulls forwardly upon it to withdraw the poppet pin 136 from the aperture 126 in which it is resting, thereby unlocking the tilt plate 114.

The seat may then be manually tilted to the desired angle either left or right, and the handle 130 is then released whereupon the poppet pin 136 fits into another one of the apertures 126 to latch the seat 68 in its new tilt position.

A central portion 144 of the tilt plate 114 is raised to support a seat plate 146 spaced above the main portion of the tilt plate 114. The seat plate 146 is rotatably attached to the raised portion 144 by a shoulder bolt 148, which serves as a vertical pivot for the seat plate 146. A collar 150 is fixed to the tilt plate 114, encircling the raised portion 144 thereof, and has a plurality of angularly spaced apertures 152 for receiving the swing latching poppet pin 154, which is mounted on the seat plate 146 for latching the seat in a desired annular position about the pivot 148.

The poppet pin 154 is slidable in a downturned flange 156 at the forward end of the seat plate 146, and is urged rearwardly into one of the apertures 152 by a compression coil spring 158, which is seated between flange 156 and a washer 160 fitted in a groove (not separately designated) on the pin. The pin 154 extends forwardly beyond the forward edge of the seat 68, and may conveniently be provided with a knob 162 or other type of handle for manual actuation.

The construction of the second embodiment of the invention is compact, yet it provides for full flexibility of adjustment for the seat, allowing the seat to be swung about a vertical axis, tilted about a horizontal axis, and moved fore and aft to any one of a plurality of different positions to provide full comfort and convenience for the vehicle operator.

What is claimed is:

1. A vehicle seat suspension assembly comprising a base for attachment to a rigid part of a vehicle or the like, first pivot means on said base near the forward end thereof, a pivot arm pivoted upon said first pivot means and extending rearwardly therefrom, second pivot means on said base near the rear thereof, third pivot means carried by said pivot arm near the rear thereof, means for adjusting the longitudinal position of said third pivot relative to said pivot arm, a direct acting hydraulic damping device connected between said second pivot and said third pivot for damping relative oscillating movement thereof, a spring surrounding said damping device for urging said third pivot away from said second pivot, and means for supporting a seat upon said pivot arm near the rear thereof, said seat support means including a longitudinally slidable member, means for releasably latching said slidable member relative to said pivot arm, and means for attaching a seat pan to said slidable member, whereby the seat pan is adjustable in position longitudinally along said pivot arm.

2. A vehicle seat construction comprising a base for mounting on a vehicle or the like, a first pivot mounted near the front of said base, a second pivot mounted near the back of said base, an arm pivoted on said first pivot and extending rearwardly therefrom over said second pivot, a third pivot on said arm above said second pivot, a direct acting hydraulic shock absorber having two relatively movable parts connected respectively to said second pivot and to said arm mounted pivot for damping relative movement therebetween, a coil spring connected between said relatively movable parts of the shock absorber for resiliently supporting said arm above said base, and means for adjustably supporting a seat upon said arm, said supporting means including a first member longitudinally slidable along said arm, means for releasably latching said first member in any one of a plurality of different longitudinal positions along said arm, an intermediate member above said first member, horizontal pivot means parallel to said arm for mounting said intermediate member upon said first member, latch means for latching said intermediate member in any one of a plurality of preselected angular positions relative to said first member, a third member above said intermediate member, vertical pivot means connecting said third member to said intermediate member, and latch means for selectively latching said third member in any one of a plurality of angular positions relative to said intermediate member.

References Cited in the file of this patent

UNITED STATES PATENTS

| | | |
|---|---|---|
| 2,452,280 | Zahller | Oct. 26, 1948 |
| 2,489,981 | Rose | Nov. 29, 1949 |
| 2,573,077 | White | Oct. 30, 1951 |
| 2,641,308 | Block | June 9, 1953 |
| 2,707,986 | Johnson | May 10, 1955 |
| 2,721,604 | Salvadore et al. | Oct. 25, 1955 |
| 2,800,948 | Omon et al. | July 30, 1957 |
| 2,840,140 | Harrington | June 24, 1958 |
| 2,868,273 | Barnett | Jan. 13, 1959 |
| 2,877,825 | Olson | Mar. 17, 1959 |